US008606822B2

(12) United States Patent
Dudgeon et al.

(10) Patent No.: US 8,606,822 B2
(45) Date of Patent: Dec. 10, 2013

(54) APPARATUS AND METHOD TO OPTIMIZE THE AVAILABLE STORAGE CAPACITY OF A PLURALITY OF SEQUENTIAL DATA STORAGE MEDIA DISPOSED IN A DATA STORAGE SYSTEM

(75) Inventors: Kyle Barret Dudgeon, Vail, AZ (US); Harold Steven Huber, Tucson, AZ (US); David Charles Reed, Tucson, AZ (US); Max Douglas Smith, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1273 days.

(21) Appl. No.: 12/192,944

(22) Filed: Aug. 15, 2008

(65) Prior Publication Data

US 2010/0042663 A1 Feb. 18, 2010

(51) Int. Cl.
*G06F 7/00* (2006.01)
*G06F 17/30* (2006.01)
*G06F 12/00* (2006.01)

(52) U.S. Cl.
USPC .......................................... 707/802; 707/822

(58) Field of Classification Search
USPC .................................. 707/796, 791, 673, 737
See application file for complete search history.

(56) References Cited

U.S. PATENT DOCUMENTS

| 5,790,886 | A | 8/1998 | Allen |
| 5,900,883 | A | 5/1999 | Crucs |
| 5,969,893 | A | 10/1999 | Basham et al. |
| 6,199,146 | B1 | 3/2001 | Pence |
| 6,718,404 | B2 | 4/2004 | Reuter et al. |
| 6,804,690 | B1 | 10/2004 | Dysert et al. |
| 6,868,429 | B2 | 3/2005 | Fontijn |
| 7,603,530 | B1 * | 10/2009 | Liikanen et al. .............. 711/162 |
| 2005/0050265 | A1 * | 3/2005 | Dahman et al. ............... 711/111 |
| 2005/0286862 | A1 | 12/2005 | Cho |

* cited by examiner

*Primary Examiner* — Kimberly Wilson
*Assistant Examiner* — Hexing Liu
(74) *Attorney, Agent, or Firm* — Dale F. Regelman; Quarles & Brady LLP (57) ABSTRACT

A method to optimize use of available storage capacity of a plurality of sequential data storage media, wherein the method provides (M) sequential data storage media each comprising a plurality of blockids, where the (i)th sequential data storage medium comprises an (i)th available storage capacity, and where (M) is greater than or equal to 2, and where (i) is greater than or equal to 1 and less than or equal to (M). The method then receives source data comprising a plurality of segments, determines a quantum of data to store, determines if the quantum of data to store is substantially equal to an (i)th available storage capacity. If the quantum of data to store is substantially equal an (i)th available storage capacity, then the method writes the source data to an (i)th sequential data storage medium.

12 Claims, 4 Drawing Sheets

APPARATUS AND METHOD TO OPTIMIZE THE AVAILABLE STORAGE CAPACITY OF A PLURALITY OF SEQUENTIAL DATA STORAGE MEDIA DISPOSED IN A DATA STORAGE SYSTEM

FIELD OF THE INVENTION

This invention relates to an apparatus and method to optimize the available storage capacity of a plurality of sequential data storage media disposed in a data storage system.

BACKGROUND OF THE INVENTION

Computing devices generate information. It is known in the art to store such information using a plurality of data storage media disposed in an automated data storage system. Such data storage systems often comprise a plurality of sequential data storage media, such as for example magnetic tape storage media, disposed in individual portable housings, i.e. cassettes. Sometimes the nominal storage capacity of one or more of those sequential data storage media is not completely utilized, thereby resulting in unused available storage capacity.

SUMMARY OF THE INVENTION

Applicants' invention comprises a method to optimize use of available storage capacity of a plurality of sequential data storage media. The method provides (M) sequential data storage media, each comprising a plurality of blockids, where the (i)th sequential data storage medium comprises an (i)th available storage capacity, and where (M) is greater than or equal to 2, and where (i) is greater than or equal to 1 and less than or equal to (M).

The method then receives source data comprising a plurality of segments, determines a quantum of data to store, determines if the quantum of data to store is substantially equal to an (i)th available storage capacity. If the quantum of data to store is substantially equal an (i)th available storage capacity, then the method writes the source data to an (i)th sequential data storage medium.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
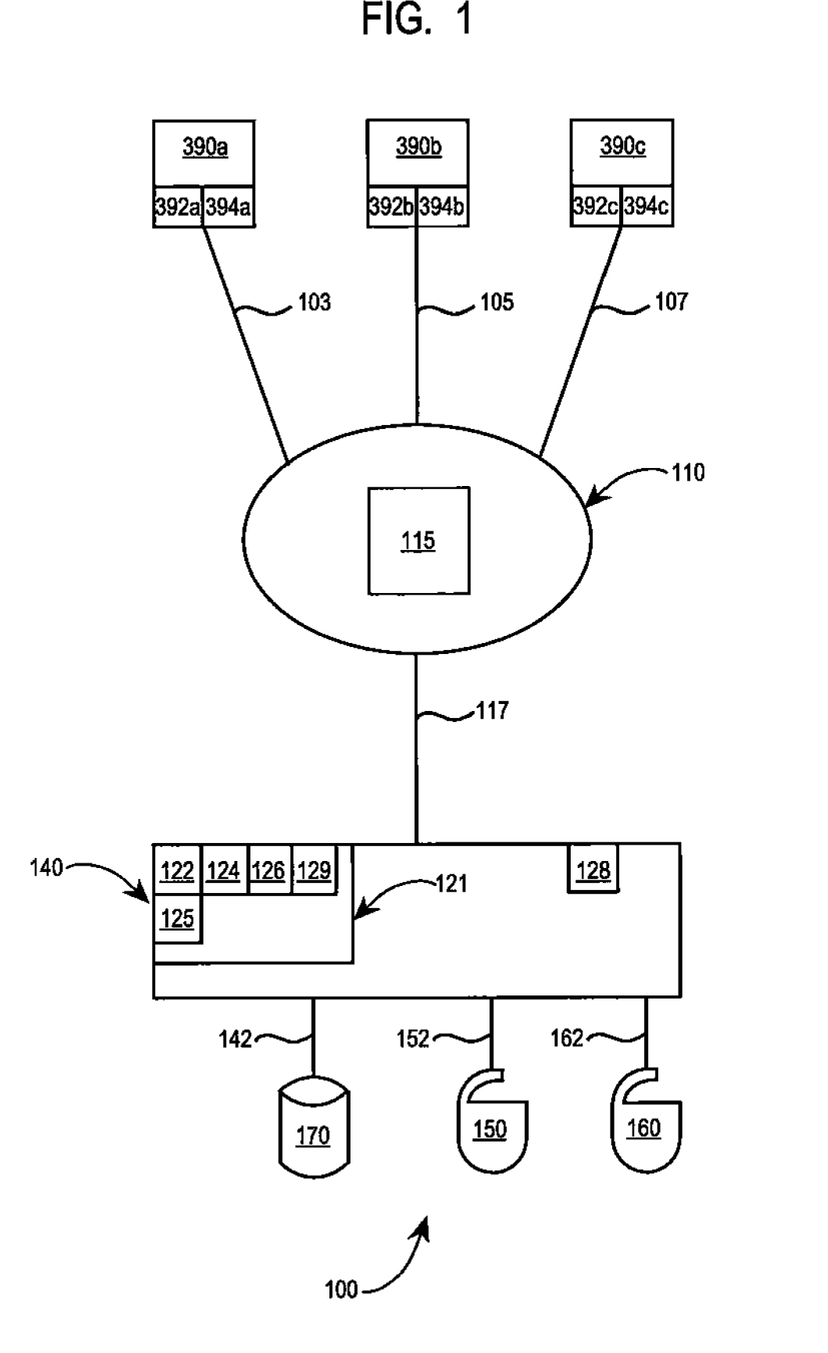
FIG. 1 is a block diagram showing one embodiment of Applicants' data storage system.

In the illustrated embodiment of FIG. 1, data storage system 100 comprises storage controller 140, DASD 170, and data storage drives 150 and 160. In the illustrated embodiment of FIG. 1, storage controller 140 communicates with DASD 170 and data storage drives 150 and 160, via I/O protocols 142, 152, and 162, respectively. I/O protocols 142, 152, and 162, may comprise any sort of I/O protocol, including without limitation a fibre channel loop, SCSI (Small Computer System Interface), iSCSI (Internet SCSI), SAS (Serial Attach SCSI), Fibre Channel, SCSI over Fibre Channel, Ethernet, Fibre Channel over Ethernet, Infiniband, and SATA (Serial ATA).

Data storage drives 150 and 160 comprise hardware, software, and firmware, to read data from, and/or write data to, a sequential data storage medium removeably disposed therein. In certain embodiments, such a sequential data storage medium comprises a magnetic tape storage medium.

Further in the illustrated embodiment of FIG. 1, Applicants' storage controller 140 is in communication with host computers 390a, 390b, and 390c. As a general matter, hosts computers 390a, 390b, and 390c, each comprises a computing device, such as a mainframe, personal computer, workstation, and combinations thereof, including an operating system such as Windows, AIX, Unix, MVS, LINUX etc. (Windows is a registered trademark of Microsoft Corporation; AIX is a registered trademark and MVS is a trademark of IBM Corporation; UNIX is a registered trademark in the United States and other countries licensed exclusively through The Open Group; and LINUX is a registered trademark of Linus Torvald).

Figure 2:
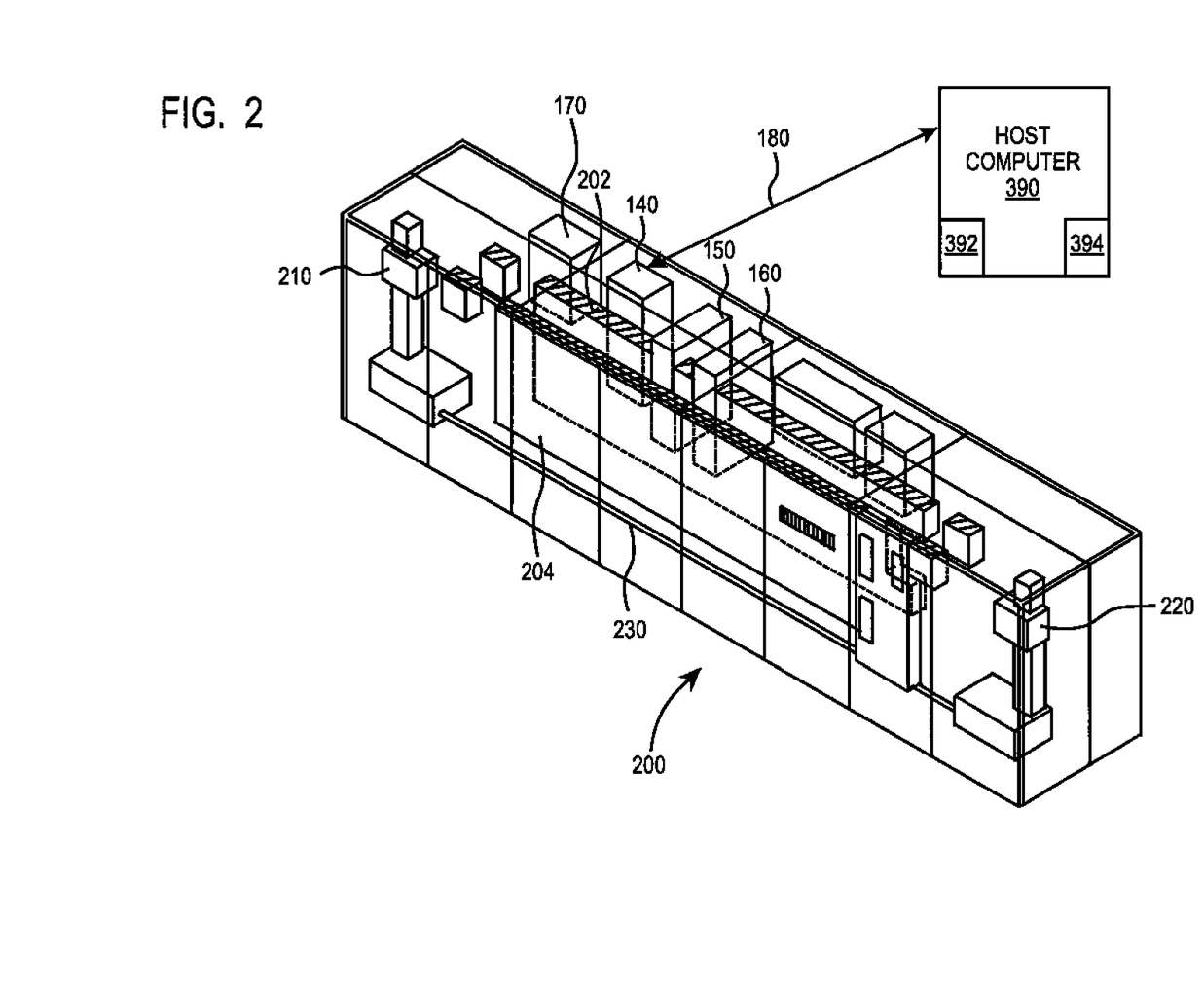
FIG. 2 illustrates Applicants' data storage system implemented in an automated tape storage library.

In the illustrated embodiments of FIGS. 1 and 2, host computers 390a, 390b, and/or 390c, further comprise a storage management program ("SMP") 392. In certain embodiments, that storage management program, such as for example and without limitation the IBM DFSMS storage management program implemented in the IBM MVS operating system, manages the transfer of data to and from a data storage system, such as data storage systems 100 (FIG. 1) and/or 200 (FIG. 2). In the illustrated embodiment of FIGS. 1 and 2, host computers 390a, 390b, and 390c, each comprises a Tape Management System ("TMS"). In certain embodiments, TMS 394 is integral with storage management program 392. In certain embodiments, TMS 394 comprises an IBM REMOVEABLE MEDIA MANAGER program.

In the illustrated embodiment of FIG. 1, Applicants' storage controller 140 comprises memory 121, microcode 122 written to memory 121, instructions 124 written to memory 121, one or more data compression algorithms 125, sequential data storage media database 126 written to memory 121, processor 128, and segment database 129 written to memory 121. Processor 128 utilizes microcode 122 to operate storage controller 140. Processor 128 utilizes instructions 126 to implement Applicants' method described herein.

In the illustrated embodiment of FIG. 1, host computers 390a, 390b, and 390c, are connected to fabric 110 utilizing I/O protocols 103, 105, and 107, respectively. I/O protocols 103, 105, and 107, may be any type of I/O protocol; for example, a Fibre Channel ("FC") loop, a direct attachment to fabric 110 or one or more signal lines used by host computers 390a, 390b, and 390c, to transfer information to and from fabric 110.

In certain embodiments, fabric 110 includes, for example, one or more PC switches 115. In certain embodiments, those one or more switches 115 comprise one or more conventional router switches. In the illustrated embodiment of FIG. 1, one or more switches 115 interconnect host computers 390a, 390b, and 390c, to storage controller 140 via I/O protocol 117. I/O protocol 117 may comprise any type of I/O interface, for example, a Fibre Channel, Infiniband, Gigabit Ethernet, Ethernet, TCP/IP, iSCSI, SCSI I/O interface or one or more signal lines used by FC switch 115 to transfer information through to and from storage controller 140, and subsequently data storage media 130, 140, 150, and 160. In other embodiments, one or more host computers, such as for example and without limitation host computers 390a, 390b, and 390c, communicate directly with storage controller 140 using I/O protocols 103, 105, and 107, respectively.

FIG. 2 shows data storage system 200. System 200 includes data drives storage controller 140, data drives 150 and 160, and DASD 170. System 200 further includes a plurality of sequential data storage media removeably disposed in a plurality of storage slots disposed in first storage wall 202 and/or second storage wall 204. System 200 also includes at least one robotic accessor 210/220 for transporting a specified sequential data storage medium between a storage slot disposed in storage wall 202/204 and data drive 150 or 160. Accessors are moveably disposed along rail 230.

Figure 3:
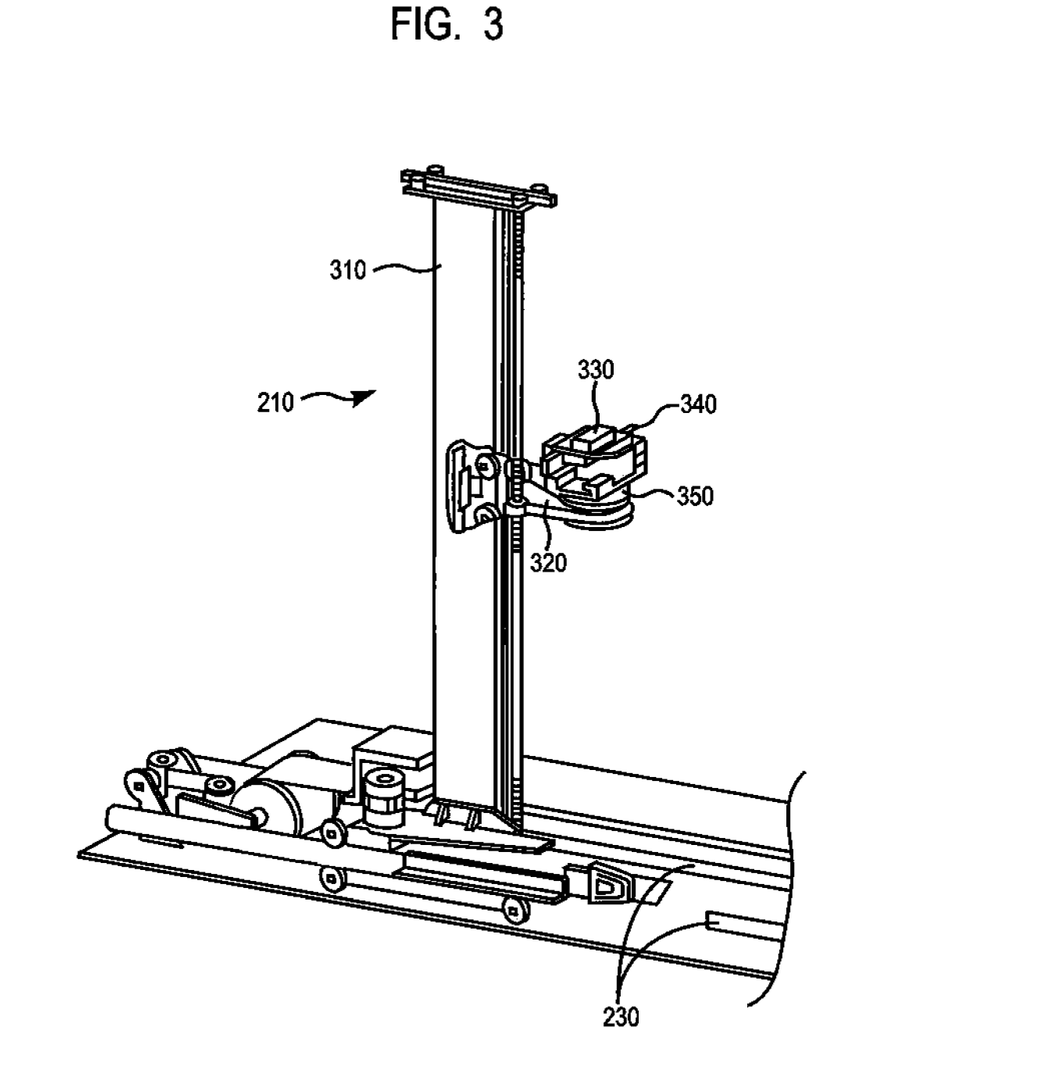
FIG. 3 illustrates a robotic accessor moveably disposed in the tape storage library of FIG. 2.

Referring now to FIGS. 2 and 3, in certain embodiments accessors 210 and 220 each comprise vertical pillar 310, a lifting servo section 3209 moveably disposed on pillar 310 and comprising bar code scanner 330, first gripper 340, and second gripper 350. In the illustrated embodiment of FIG. 2, data storage system 200 is in communication with host computer 390. Accessor 210 or 220 can receive a signal from host computer 390 designating one of said plurality of sequential data storage media, retrieve that designated sequential data storage medium from a storage slot, transport said designated sequential data storage medium to a data drive 150 or 160, and dispose that designated sequential data storage medium into the selected data drive.

In certain embodiments, the sequential data storage media moveably disposed within Applicants' data storage system comprise magnetic tape data storage medium. As those skilled in the art will appreciate, in certain embodiments, each magnetic tape data storage medium is removeably disposed within a portable housing, i.e. a cassette. Each sequential data storage medium comprises a nominal storage capacity. In addition, each sequential data storage medium comprises a plurality of blockids, i.e. storage addresses encoded along the storage medium from a first end to a second end. In certain embodiments, the blockids are sequentially numbered from a physical beginning of tape ("PBT") and end at a physical end of tape ("PET"). In other embodiments, the blockids are sequentially numbered from a logical beginning of tape ("LBT") and end at a logical end of tape ("LET").

Applicants' invention comprises a method, using Applicants' data storage system 100 and/or 200, to optimize the use of the aggregate storage capacity available using a plurality of sequential data storage media.

Figure 4:
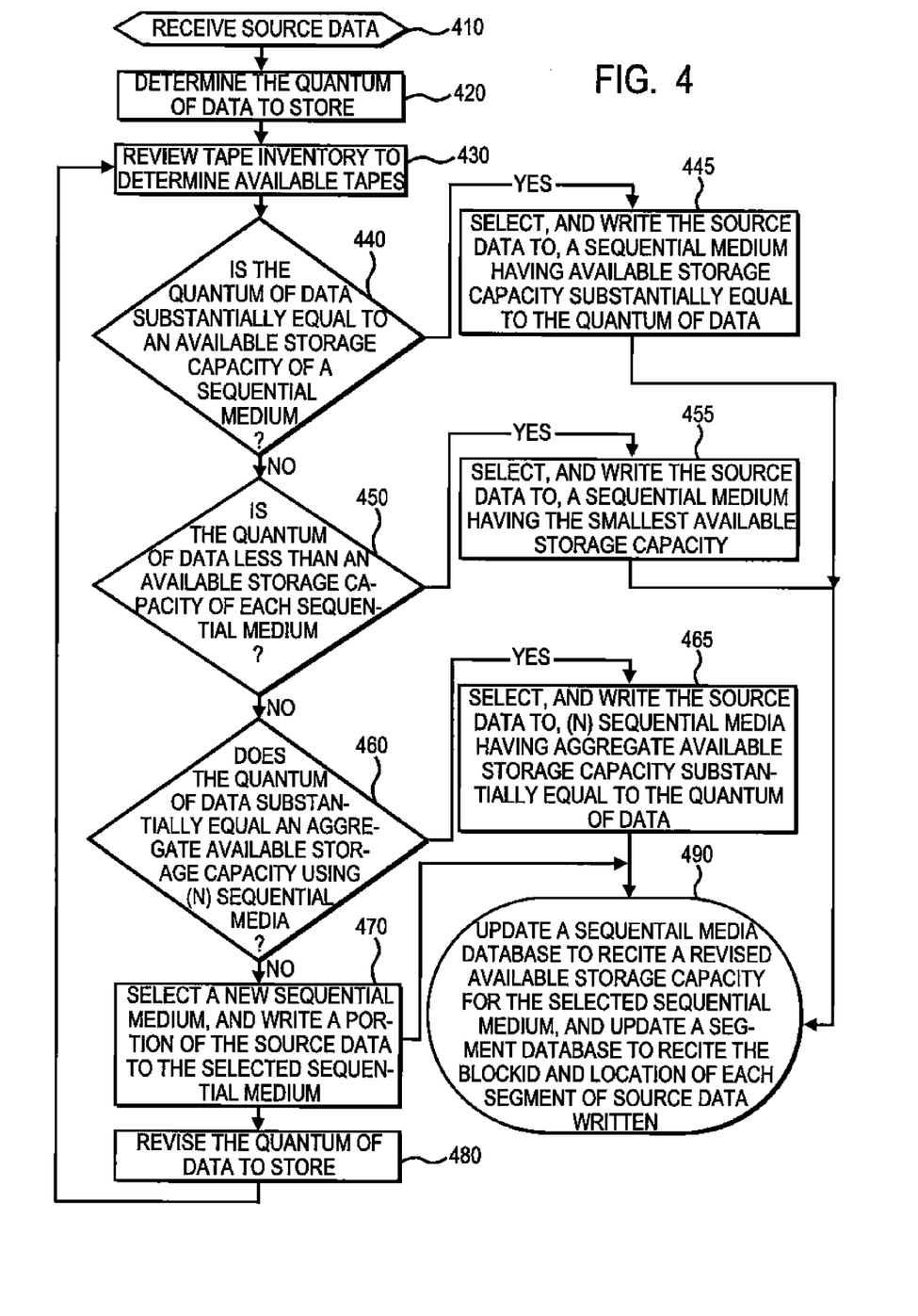
FIG. 4 is a flow chart summarizing certain steps of Applicants' method.

FIG. 4 summarizes Applicants' method. Referring now to FIG. 4, in step 410 the method provides source data. In certain embodiments, the source data of step 410 is generated by one or more host computers, such as for example one or more of host computers 390a, 390b, and/or 390c. In certain embodiments, step 410 further comprises providing a write command from an originating host computer. In certain embodiments, in step 410 an originating host computer provides the source data to Applicants' data storage controller 140 (FIGS. 1, 2).

In certain embodiments, the method optionally in step 410 writes the source data of step 410 to a direct access storage device ("DASD"), such as DASD 170 (FIGS. 1, 2). In certain embodiments, step 410 is performed by a SMP disposed in an originating host computer. In certain embodiments, step 410 is performed by a TMS disposed in an originating host computer. In certain embodiments, step 410 is performed by Applicants' storage controller 140.

In step 420, the method determines the quantum of data to store. In certain embodiments, the quantum of data to store is determined as a number of required bytes. In certain embodiments, the quantum of data to store is determined as a number of required segments. In certain embodiments, the quantum of data to store is determined as a number of required blockids. In certain embodiments, the quantum of data to store is determined as a number of required track numbers.

In certain embodiments, step 420 is performed by a SMP disposed in an originating host computer. In certain embodiments, step 420 is performed by a TMS disposed in an originating host computer. In certain embodiments, step 420 is performed by a storage controller, such as for example storage controller 140 (FIGS. 1, 2). In certain embodiments, step 420 is performed by a data drive, such as for example data drive 150 and/or 160.

In step 430, the method checks a sequential data storage media database, such as for example sequential data media database 126 (FIG. 1), to determine the available storage capacity of each of the sequential data storage media disposed in the data storage system. In certain embodiments, the available storage capacity is determined as available bytes. In certain embodiments, the available storage capacity is determined as available segments. In certain embodiments, the available storage capacity is determined as available blockids. In certain embodiments, the available storage capacity is determined as available track numbers.

In certain embodiments, step 430 is performed by a SMP disposed in an originating host computer. In certain embodiments, step 430 is performed by a TMS disposed in an originating host computer. In certain embodiments, step 430 is performed by a storage controller, such as for example storage controller 140 (FIGS. 1, 2). In certain embodiments, step 430 is performed by a data drive, such as for example data drive 150 and/or 160.

In step 440, the method determines if the quantum of data to store is substantially equal to the available storage capacity of a sequential data storage medium disposed in the data storage system. By "substantially equal," Applicants' mean that the available storage capacity is equal to, or up to ten percent (10%), the quantum of data to store. In certain embodiments, step 440 is performed by a SMP disposed in an originating host computer. In certain embodiments, step 440 is performed by a TMS disposed in an originating host computer. In certain embodiments, step 440 is performed by a storage controller, such as for example storage controller 140

(FIGS. 1, 2). In certain embodiments, step 440 is performed by a data drive, such as for example data drive 150 and/or 160.

If the method determines that an available storage capacity of a sequential data storage medium disposed in the data storage system is substantially equal to a quantum of data to store, then the method transitions from step 440 to step 445 wherein the method writes the source data to a sequential data storage medium having an available storage capacity substantially equal to the quantum of data to store.

In certain embodiments, in step 445 a SMP or alternatively a TMS disposed in an originating host computer selects the sequential data storage medium having an available storage capacity substantially equal to the quantum of data to store, causes a robotic accessor to transport that selected sequential data storage medium to a selected data drive, provides the source data to the selected data drive, and causes the selected data drive to write the source data to the selected sequential data storage medium. In certain embodiments, in step 445 Applicants' storage controller selects the sequential data storage medium having an available storage capacity substantially equal to the quantum of data to store, causes a robotic accessor to transport that selected sequential data storage medium to a selected data drive, provides the source data to the selected data drive, and causes the selected data drive to write the source data to the selected sequential data storage medium. In certain embodiments, in step 445 a data drive, such as data drive 150 or 160, selects the sequential data storage medium having an available storage capacity substantially equal to the quantum of data to store, causes a robotic accessor to transport that selected sequential data storage medium, retrieves the source data from a DASD, and writes the source data to the selected sequential data storage medium.

Applicants' method transitions from step 445 to step 490 wherein the method updates a sequential data storage media database, such as database 126, to reflect a revised available storage capacity for the selected sequential data storage medium identified in step 440, or step 450, or step 460, or the new tape of step 470. Furthermore, the method in step 490 updates a segment database, such as segment database 129, to reflect the blockid and location of each segment of source data written in step 445, or in step 455, or in step 465, or in step 470.

In certain embodiments, step 490 is performed by a SMP disposed in an originating host computer. In certain embodiments, step 490 is performed by a TMS disposed in an originating host computer. In certain embodiments, step 490 is performed by a storage controller, such as for example storage controller 140 (FIGS. 1, 2). In certain embodiments, step 490 is performed by a data drive, such as for example data drive 150 and/or 160.

If the method determines in step 440 that the available storage capacity of no sequential data storage medium disposed in the data storage system substantially equals the quantum of data to store, then the method transitions from step 440 to step 450 wherein the method determines if the quantum of data to store is less than the available storage capacity of a sequential data storage media disposed in the data storage system.

In certain embodiments, step 450 is performed by a SMP disposed in an originating host computer. In certain embodiments, step 450 is performed by a TMS disposed in an originating host computer. In certain embodiments, step 450 is performed by a storage controller, such as for example storage controller 140 (FIGS. 1, 2). In certain embodiments, step 450 is performed by a data drive, such as for example data drive 150 and/or 160.

If the method determines in step 450 that quantum of data to store is less than the available storage capacity of a sequential data storage media disposed in the data storage system, then the method transitions from step 450 to step 455 wherein the method selects a sequential data storage medium comprising the smallest available storage capacity, and writes the source data to that selected sequential data storage medium. The method transitions from step 455 to step 490 and continues as described herein.

In certain embodiments, in step 455 a SMP or alternatively a TMS disposed in an originating host computer selects a sequential data storage medium having the smallest available storage capacity, causes a robotic accessor to transport that selected sequential data storage medium to a selected data drive, provides the source data to the selected data drive, and causes the selected data drive to write the source data to the selected sequential data storage medium. In certain embodiments, in step 455 Applicants' storage controller selects a sequential data storage medium having the smallest available storage capacity, causes a robotic accessor to transport that selected sequential data storage medium to a selected data drive, provides the source data to the selected data drive, and causes the selected data drive to write the source data to the selected sequential data storage medium. In certain embodiments, in step 455 a data drive, such as data drive 150 or 160, selects the sequential data storage medium having the smallest available storage capacity, causes a robotic accessor to transport that selected sequential data storage medium, retrieves the source data from a DASD, and writes the source data to the selected sequential data storage medium.

If the method determines in step 450 that the quantum of data to store is not less than the available storage capacity of a sequential data storage medium disposed in the data storage system, then the method transitions from step 450 to step 460 wherein the method determines if the quantum of data to store is substantially equal to an aggregate available storage capacity of (N) sequential data storage media disposed in the data storage system, wherein (N) is greater than or equal to 2.

In certain embodiments, step 460 is performed by a SMP disposed in an originating host computer. In certain embodiments, step 460 is performed by a TMS disposed in an originating host computer. In certain embodiments, step 460 is performed by a storage controller, such as for example storage controller 140 (FIGS. 1, 2). In certain embodiments, step 460 is performed by a data drive, such as for example data drive 150 and/or 160.

If the method determines in step 460 that the quantum of data to store is substantially equal to an aggregate available storage capacity of (N) sequential data storage media disposed in the data storage system, then the method transitions from step 460 to step 465 wherein the method selects the (N) sequential data storage media identified in step 460, and writes the source data to those (N) sequential data storage media. The method transitions from step 465 to step 490, and continues as described herein.

In certain embodiments, in step 465 a SMP or alternatively a TMS disposed in an originating host computer selects (N) sequential data storage media having an aggregate available storage capacity substantially equal to the quantum of data to store, causes a robotic accessor to transport the selected (N) sequential data storage media to one or more selected data drives, provides the source data to the selected one or more data drives, and causes the one or more selected data drives to write the source data to the (N) selected sequential data storage media. In certain embodiments, in step 465 Applicants' storage controller selects (N) sequential data storage media having an aggregate available storage capacity substantially equal to the quantum of data to store, causes a robotic accessor to transport the selected (N) sequential data storage media to one or more selected data drives, provides the source data to the selected one or more data drives, and causes the one or more selected data drives to write the source data to the (N) selected sequential data storage media. In certain embodiments, in step 465 a data drive, such as data drive 150 or 160, selects (N) sequential data storage media having an aggregate available storage capacity substantially equal to the quantum of data to store, causes a robotic accessor to seriatim transport the selected (N) sequential data storage media, retrieves the source data from a DASD, and seriatim writes the source data to the (N) selected sequential data storage media.

If the method determines in step 460 that the quantum of data to store is not substantially equal to the aggregate available storage capacity of (N) sequential data storage media disposed in the data storage system, then the method transitions from step 460 to step 470 wherein the method writes a portion of the source data to a new sequential data storage medium.

In certain embodiments, in step 470 a SMP or alternatively a TMS disposed in an originating host computer selects a new sequential data storage medium, causes a robotic accessor to transport the selected new sequential data storage medium to one or more selected data drives, provides the source data to the selected one or more data drives, and causes the one or more selected data drives to write the source data to the selected new sequential data storage medium. In certain embodiments, in step 470 Applicants' storage controller selects a new sequential data storage medium, causes a robotic accessor to transport the selected new sequential data storage medium to one or more selected data drives, provides the source data to the selected one or more data drives, and causes the one or more selected data drives to write the source data to the selected new sequential data storage medium. In certain embodiments, in step 465 a data drive, such as data drive 150 or 160, selects a new sequential data storage medium, causes a robotic accessor to transport the selected new sequential data storage medium, retrieves the source data from a DASD, and writes the source data to the selected new sequential data storage medium.

The method transitions from step 470 to step 490, and also to step 480. In step 480, the method revises the quantum of data to store. In certain embodiments, step 480 is performed by a SMP disposed in an originating host computer. In certain embodiments, step 480 is performed by a TMS disposed in an originating host computer. In certain embodiments, step 480 is performed by a storage controller, such as for example storage controller 140 (FIGS. 1, 2). In certain embodiments, step 480 is performed by a data drive, such as for example data drive 150 and/or 160. Applicants' method transitions from step 480 to step 430 and continues as described herein.

In certain embodiments, individual steps recited in FIG. 4 may be combined, eliminated, or reordered.

In certain embodiments, Applicants' invention includes instructions, such as instructions 124 (FIG. 1), residing in computer readable medium, such as for example memory 121 (FIG. 1 wherein those instructions are executed by a processor, such as processor 128 (FIG. 1), to perform one or more of steps 410, 420, 430, 440, 445, 450, 455, 460, 465, 470, 480, and/or 490, recited in FIG. 4.

In other embodiments, Applicants' invention includes instructions residing in any other computer program product, where those instructions are executed by a computer external to, or internal to, data storage system 100 or 200, to perform one or more of steps 410, 420, 430, 440, 445, 450, 455, 460, 465, 470, 480, and/or 490, recited in FIG. 4. In either case, the instructions may be encoded in computer readable medium comprising, for example, a magnetic information storage medium, an optical information storage medium, an electronic information storage medium, and the like. By "electronic storage media," Applicants mean, for example and without limitation, one or more devices, such as and without limitation, a PROM, EPROM, EEPROM, Flash PROM, compactflash, smartmedia, and the like.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to optimize use of available storage capacity of a plurality of data storage media, comprising:

providing a data storage system comprising (M) magnetic tape data storage media each comprising a plurality of blockids, wherein each magnetic tape data storage medium comprises an available storage capacity, wherein (M) is greater than or equal to 2;

receiving from a host computer comprising a tape management system (TMS), and in communication with said data storage system, source data comprising a plurality of segments;

determining by said TMS a quantum of data to store;

selecting by said TMS an (i)th a magnetic tape data storage medium having a storage capacity substantially equal to said quantum of data, wherein (i) is greater than or equal to 1 and less than or equal to (M);

selecting by said TMS a tape storage drive disposed in said data storage system;

causing by said TMS said selected tape storage drive to write said source data to said selected magnetic tape data storage medium;

operative if said quantum of data to store is not substantially equal to an (i)th available storage capacity, determining if said quantum of data is less than an (i)th available storage capacity;

operative if the quantum of data to store is less than an (i)th available storage capacity, writing said source data to an (i)th magnetic tape data storage medium;

updating a segment database with a blockid and storage location for each segment of source data written to said (i)th magnetic tape data storage medium; and updating a magnetic tape data storage medium database to recite an updated (i)th storage capacity;

operative if said quantum of data to store is not less than an (i)th available storage capacity, determining if said quantum of data is substantially equal to an aggregate available storage capacity for (N) of said (M) inventoried magnetic tape storage media, wherein (N) is less than or equal to (M);

operative if said quantum of data is substantially equal to an aggregate available storage capacity for (N) of said (M) inventoried magnetic tape storage media, writing said source data to said (N) magnetic tape data storage media;

updating a segment database with a blockid and storage location for each segment of source data written to said (N) magnetic tape data storage media; and updating a magnetic tape data storage medium database to recite an updated storage capacity for each of said (N) magnetic tape data storage media.

2. The method of claim 1, further comprising:
updating a segment database with a blockid and storage location for each segment of source data written to said (i)th magnetic tape data storage medium; and
updating a magnetic tape data storage medium database to recite an updated (i)th storage capacity.

3. The method of claim 1, further comprising:
operative if said quantum of data is not substantially equal to an aggregate available storage capacity for (N) of said (M) inventoried magnetic tape storage media;
writing a portion of said source data to a new magnetic tape storage medium;
revising said quantum of data to store;
updating a segment database with a blockid and storage location for each segment of source data written to said (i)th magnetic tape data storage medium; and
adding said new magnetic tape storage medium to said magnetic data storage medium database;
indicating in said magnetic tape data storage medium database that said new magnetic tape data storage medium comprises no available storage capacity.

4. The method of claim 3, wherein:
said storage library comprises one or more robotic accessors to bidirectionally transport said plurality of magnetic tape storage media from a plurality of storage slots to said one or more tape storage devices.

5. A host computer comprising a tape management system (TMS) a non-transitory computer readable storage medium comprising computer readable program code disposed therein to optimize use of available storage capacity of (M) magnetic tape data storage media disposed in an external data storage system, wherein each magnetic tape data storage medium comprises a plurality of blockids, wherein the (i)th magnetic tape data storage medium comprises an (i)th available storage capacity, wherein (i) is greater than or equal to 1 and less than or equal to (M), the computer readable program code comprising a series of computer readable program steps to effect:
providing by said TMS to said data storage system source data comprising a plurality of segments;
determining by said TMS a quantum of data to store;
selecting by said TMS an (i)th magnetic tape data storage medium having a storage capacity substantially equal to said quantum of data;
selecting by said TMS a tape storage drive disposed in said data storage system;
causing by said TMS said selected tape storage drive to write said source data to said (i)th magnetic tape data storage medium;
operative if said quantum of data to store is not substantially equal to an (i)th available storage capacity, determining if said quantum of data is less than an (i)th available storage capacity;
operative if the quantum of data to store is less than an (i)th available storage capacity, writing said source data to an (i)th magnetic tape data storage medium;
updating a segment database with a blockid and storage location for each segment of source data written to said (i)th magnetic tape data storage medium; and
updating a magnetic tape data storage medium database to recite an updated (i)th storage capacity;
operative if said quantum of data to store is not less than an (i)th available storage capacity, determining if said quantum of data is substantially equal to an aggregate available storage capacity for (N) of said (M) inventoried magnetic tape storage media, wherein (N) is less than or equal to (M);
operative if said quantum of data is substantially equal to an aggregate available storage capacity for (N) of said (M) inventoried magnetic tape storage media, writing said source data to said (N) magnetic tape data storage media;
updating a segment database with a blockid and storage location for each segment of source data written to said (N) magnetic tape data storage media; and
updating a magnetic tape data storage medium database to recite an updated storage capacity for each of said (N) magnetic tape data storage media.

6. The host computer of claim 5, said computer readable program code further comprising a series of computer readable program steps to effect:
updating a segment database with a blockid and storage location for each segment of source data written to said (i)th magnetic tape data storage medium; and
updating a magnetic tape data storage medium database to recite an updated (i)th storage capacity.

7. The host computer of claim 5, said computer readable program code further comprising a series of computer readable program steps to effect:
operative if said quantum of data is not substantially equal to an aggregate available storage capacity for (N) of said (M) inventoried magnetic tape storage media;
writing a portion of said source data to a new magnetic tape storage medium;
revising said quantum of data to store;
updating a segment database with a blockid and storage location for each segment of source data written to said (i)th magnetic tape data storage medium; and
adding said new magnetic tape storage medium to said magnetic data storage medium database;
indicating in said magnetic tape data storage medium database that said new magnetic tape data storage medium comprises no available storage capacity.

8. The host computer of claim 7, wherein:
said storage library comprises one or more robotic accessors to bidirectionally transport said plurality of magnetic tape storage media from a plurality of storage slots to said one or more tape storage devices.

9. A computer program product encoded in a non-transitory computer readable storage medium and useable with a programmable processor to optimize use of available storage capacity of (M) magnetic tape data storage media each comprising a plurality of blockids, wherein each magnetic tape data storage medium comprises an available storage capacity comprising:
computer readable program code which causes said programmable computer processor to provide by a host computer comprising a tape management system (TMS), and in communication with said data storage system, source data comprising a plurality of segments;
computer readable program code which causes TMS to determine a quantum of data to store;
computer readable program code which TMS to select an (i)th data storage medium having a storage capacity substantially equal to said quantum of data, wherein (i) is greater than or equal to 1 and less than or equal to (M);
computer readable program code which causes said TMS to select a tape storage drive disposed in said data storage system;
computer readable program code which causes said TMS to write said source data to said (i)th magnetic tape data storage medium;
computer readable program code which, if said quantum of data to store is not substantially equal to an (i)th available storage capacity, causes said programmable computer processor to determine if said quantum of data is less than an (i)th available storage capacity;

computer readable program code which, if the quantum of data to store is less than an (i)th available storage capacity, causes said programmable computer processor to write said source data to an (i)th magnetic tape data storage medium;

computer readable program code which causes said programmable computer processor to update a segment database with a blockid and storage location for each segment of source data written to said (i)th magnetic tape data storage medium; and computer readable program code which causes said programmable computer processor to update a magnetic tape data storage medium database to recite an updated (i)th storage capacity;

computer readable program code which, if said quantum of data to store is not less than an (i)th available storage capacity, causes said programmable computer processor to determine if said quantum of data is substantially equal to an aggregate available storage capacity for (N) of said (M) inventoried magnetic tape storage media, wherein (N) is less than or equal to (M);

computer readable program code which, if said quantum of data is substantially equal to an aggregate available storage capacity for (N) of said (M) inventoried magnetic tape storage media, causes said programmable computer processor to write said source data to said (N) magnetic tape data storage media;

computer readable program code which causes said programmable computer processor to update a segment database with a blockid and storage location for each segment of source data written to said (N) magnetic tape data storage media; and computer readable program code which causes said programmable computer processor to update a magnetic tape data storage medium database to recite an updated storage capacity for each of said (N) magnetic tape data storage media.

10. The computer program product of claim 9, further comprising:

computer readable program code which causes said TMS to update a segment database with a blockid and storage location for each segment of source data written to said (i)th magnetic tape data storage medium; and computer readable program code which causes said programmable computer processor to update a magnetic tape data storage medium database to recite an updated (i)th storage capacity.

11. The computer program product of claim 9, further comprising:

computer readable program code which, if said quantum of data is not substantially equal to an aggregate available storage capacity for (N) of said (M) inventoried magnetic tape storage media, causes said programmable computer processor to write a portion of said source data to a new magnetic tape storage medium;

computer readable program code which causes said programmable computer processor to revise said quantum of data to store;

computer readable program code which causes said programmable computer processor to update a segment database with a blockid and storage location for each segment of source data written to said (i)th magnetic tape data storage medium; and computer readable program code which causes said programmable computer processor to add said new magnetic tape storage medium to said magnetic tape data storage medium database;

computer readable program code which causes said programmable computer processor to indicate in said magnetic tape data storage medium database that said new magnetic tape data storage medium comprises no available storage capacity.

12. The article of manufacture of claim 11, wherein:

said storage library comprises one or more robotic accessors to bidirectionally transport said plurality of magnetic tape storage media from a plurality of storage slots to said one or more tape storage devices.

* * * * *